United States Patent [19]
Schnittgrund et al.

[11] Patent Number: 5,476,991
[45] Date of Patent: Dec. 19, 1995

[54] REFRACTORY FOR CONTAINMENT OF FLUORIDE-RICH SALT MELTS

[75] Inventors: Gary D. Schnittgrund, Granada Hills; Peter E. D. Morgan, Thousand Oaks, both of Calif.

[73] Assignee: Rockwell International Corporation, Seal Beach, Calif.

[21] Appl. No.: 209,338

[22] Filed: Feb. 1, 1994

[51] Int. Cl.⁶ .................................................... C22B 7/00
[52] U.S. Cl. .................. 588/201; 588/206; 588/207; 264/30
[58] Field of Search ............................ 588/201, 206, 588/207; 264/30

[56] References Cited

U.S. PATENT DOCUMENTS

| | | | |
|---|---|---|---|
| 3,773,558 | 11/1973 | Charbonnier et al. | 429/194 |
| 3,859,427 | 1/1975 | Francis et al. | 423/600 |
| 4,012,563 | 3/1977 | Farrington et al. | 429/104 |
| 4,193,954 | 3/1980 | Speronello | 264/13 |
| 4,447,262 | 5/1984 | Gay et al. | 75/65 R |
| 4,631,183 | 12/1986 | Lalancette et al. | 423/659 |

*Primary Examiner*—Ngoclan Mai
*Attorney, Agent, or Firm*—Montanye George A.; Harry B. Field; Steven E. Kahm

[57] ABSTRACT

Molten salt process for destruction of fluorine-containing waste in a molten salt such as molten sodium carbonate, and forming fluoride salts in the molten salt bath. The destructive phase change of conventional alpha-alumina refractory of the molten salt retaining vessel in the presence of such fluoride salts is avoided according to the invention by employing phase change resistant beta-alumina refractory bricks.

12 Claims, 1 Drawing Sheet

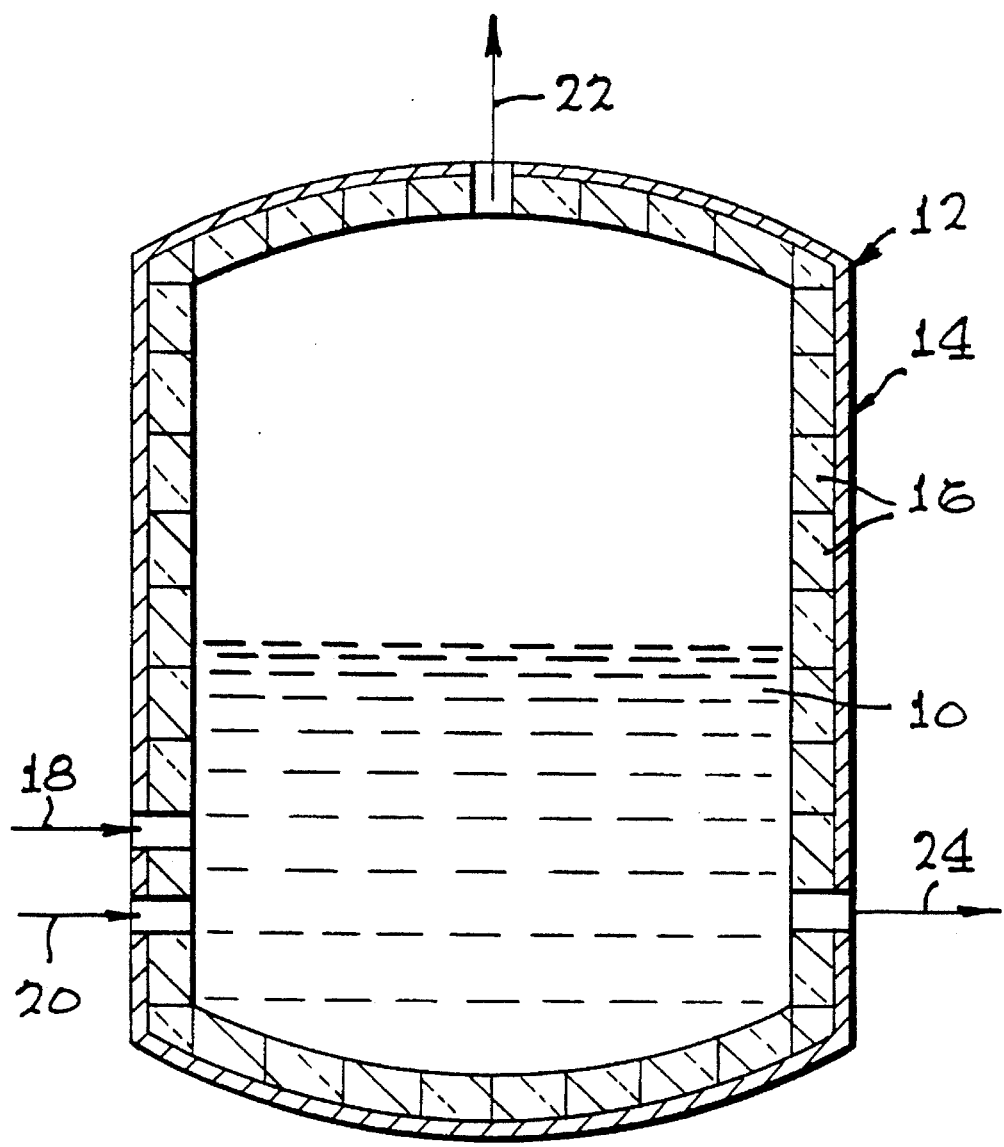

REFRACTORY FOR CONTAINMENT OF FLUORIDE-RICH SALT MELTS

BACKGROUND OF THE INVENTION

1. Field of the Invention

This invention relates to the destruction of organic wastes in a molten salt medium, and is particularly directed to an improved refractory for containment of molten salt such as alkali carbonate used in a reaction for oxidative destruction of fluorine-containing organic waste, and resistant to destruction from fluoride salts, particularly sodium fluoride, in the melt and produced by such reaction.

2. Description of the Prior Art

Molten salt oxidation (MSO) has been demonstrated to be a suitable technology for destroying hazardous organic wastes. The technology achieves this destruction by the catalytic oxidation of the organic compounds by molten salts at elevated temperatures. Certain of such organic wastes comprise fluorine-containing compounds such as Freons, which are chloro-fluoro methanes, and halons, which are similar to Freons but contain a mixture of bromine and fluorine atoms.

Conventional refractory bricks such as alpha-alumina bricks are employed to form the wall of molten salt reaction vessels for containing molten salts such as alkali carbonate, e.g. sodium carbonate, at temperatures of 900°–1000° C. Such traditional refractory bricks are based on pressed and sintered alpha-alumina. However, in the presence of even small amounts of fluoride salts, particularly NaF, present in the molten salt bath as products of the oxidation reaction of the fluorine-containing organic waste with the molten salt, the alpha-alumina readily converts to beta-alumina with a resultant destructive expansive phase change. The life of the refractories thus becomes limited.

Thus, it has been found that alpha-alumina bricks will crack and swell when in contact with sodium carbonate molten salt containing even small amounts of fluoride salts such as NaF. The fluoride does not enter into the reaction with the alumina, e.g. to form aluminum fluoride, but rather at fairly low temperatures, e.g in the 500° C. temperature range, the fluorine apparently acts in some way as a catalyst to react sodium with the alpha alumina structure to form the beta-alumina structure $Na_2O \cdot 11Al_2O_3$, with an approximate 18% volume expansion which is obviously destructive to the integrity of a solid alumina-containing brick.

SUMMARY OF THE INVENTION

The solution to the above problem is to use beta-alumina refractories for containment of fluoride-containing salts in molten alkali carbonate, particularly sodium carbonate, salts in the molten salt destruction of fluorine-containing organic waste. Such beta-alumina refractories remain stable and are essentially non-reactive while in contact with such fluoride-containing salts, e.g. NaF, at reaction temperatures of 900°–1000° C. of the fluorine-containing organic waste with the alkali carbonate molten salt under oxidation conditions, e.g. in the presence of air.

Making a pressed and sintered brick from pre-converted beta-alumina combines the benefits of mass-produced pressed and sintered brick with the naturally phase-change conversion resistant beta-alumina.

OBJECTS OF THE INVENTION

It is accordingly an object of the present invention to provide an improved refractory for containment of molten salt in the destructive oxidation of fluorine-containing organic waste.

Another object is the provision of refractory for molten salt reaction vessels for oxidizing fluorine-containing organic waste, which is resistant to destruction by the fluoride salt reaction products formed in the molten salt.

A still further object is to provide a form of alumina refractory bricks for molten salt, e.g. sodium carbonate, reaction vessels in the oxidative destruction of fluorine-containing organic waste, e.g. Freons or halons, and forming fluoride salts such as NaF, in the molten salt bath during the reaction, such form of alumina being stable and resistant to destructive phase changes in the presence of such fluoride salts.

Other objects and advantages of the invention will appear hereinafter.

DESCRIPTION OF THE DRAWING

The sole FIGURE of the drawing represents a simplified diagram of a molten salt oxidation furnace or system which can be employed for molten salt oxidation of fluorine-containing organic waste and having a wall formed of beta-alumina refractory bricks according to the invention.

DETAILED DESCRIPTION OF THE INVENTION AND PREFERRED EMBODIMENTS

Referring to the drawing, there is illustrated a molten salt oxidation system showing a molten salt bath, e.g. a molten sodium carbonate bath, at 10 in a vessel 12 having a wall 14 formed of beta-alumina refractory bricks 16, according to the invention.

The feed of the fluorine-containing organic waste is introduced at 18, together with air at 20 into the molten sodium carbonate bath. The off-gas including $CO_2$ gas formed by the oxidation reaction, and $N_2$, is discharged at 22. The molten sodium carbonate salt and spent salts including fluoride reaction products and ash are discharged at 24.

The molten bath 10 contained in the bottom of the treatment vessel and into which the organic fluorine-containing waste is introduced can be of any known composition serving as a medium for treatment, i.e. oxidation, of such organic waste. Thus, such molten salt bath can contain an alkali metal carbonate such as sodium carbonate or potassium carbonate, or mixtures thereof, e.g. a mixture of 50% $Na_2CO_3$ and 50% $K_2CO_3$, by weight, mixtures of alkali metal carbonate such as sodium carbonate and alkali metal chloride such as sodium chloride, e.g. 10% $Na_2CO_3$ +90% NaCl, by weight, and the like.

The organic waste feed treated in the molten salt bath 10 contains fluorine-containing compounds. These compounds can include completely substituted organics with F substituted for H, or organics which are predominantly chlorinated or brominated, with just 1 or 2 F atoms, e.g. as fluorocarbons, chlorofluorocarbons such as Freons, and bromofluorocarbons such as the halons. For example, the Freons can include trichloro-monofluoro methane, dichloro-difluoro methane and chloro-trifluoro methane. Examples of halons are difluoro-monochloro-monobromo methane and bromo-trifluoromethane.

The temperature of the molten salt bath for carrying out the oxidation of the organic waste generally ranges from about 700° to about 1000° C., e.g. about 900° C., and such temperature can be maintained by incorporating the molten salt process vessel 12, e.g. within an electric furnace (not shown). A portion of the heat is generated by the oxidation reaction itself.

The fluorine compounds present in the organic waste feed at 18, e.g. in the form of a Freon or halon introduced into the molten salt bath 10, reacts, e.g. with the alkali carbonate molten salt, to form alkali metal halides, including alkali metal fluorides, as well as other alkali metal halides, such as NaBr and NaCl. Examples of fluoride-containing melts resulting from destruction of fluorine-containing organic waste in molten salt baths which can be retained by beta-alumina refractory without damage or destruction thereof are $Na_2CO_3$ +1 to 95% NaF.

The beta-alumina bricks can be made by heating a mixture of alpha-alumina and sodium carbonate in the mole ratio Na/Al of 1/11 in the presence of a few percent, e.g. 5%, of sodium fluoride at about 900° C. or greater. The resulting beta-alumina grains or particles are mixed with an organic binder such as waxes, ethyl cellulose, polystyrene, pine oil or solvent resins, and the mixture is formed to shape by pressing, drying and firing or sintering in air at 1600° C. or higher, e.g. up to 1750° C. to near full density. The binder is removed during firing. Sintering aids such as 0.5% MgO can be added to the beta-alumina-binder mixture, if desired.

Alternatively, in place of heating the mixture of alpha-alumina and sodium carbonate noted above in the presence of sodium fluoride at above 900° C., such mixture can be heated in only air at about 1200° C. or greater to form the beta-alumina grains, followed by adding binder, forming to shape, pressing, drying and firing.

As a further alternative, beta-alumina brick can be made by a dry or isostatic pressing of the beta-alumina binder mixture at 1,000–100,000 psi, e.g. 1,000–5,000 psi, combined with liquid phase sintering at a temperature approximating the melting point of the bonding phase in the brick.

An example of practice of the invention is as follows:

Molten salt consisting of 50 weight percent sodium carbonate and 50 weight percent sodium fluoride is contained in a molten salt furnace at 1000° C. Freon 14 ($CF_4$) is fed in with sufficient air, below the surface of the melt, to provide oxygen to assure complete carbon oxidation to carbon dioxide, which at 20 mole percent excess air is 1.2 moles of air for every mole of carbon added as Freon 14. The refractory to contain melt is made of beta-alumina, which is formed by conversion of alpha-alumina by heating a mixture of alpha-alumina and sodium carbonate in the mole ratio Na/Al of 1/11 and a wax binder, in air at about 1200° C., prior to being dry pressed at 3000 psi and sintered at about 1600° C. to 85 to 90% of full density. The molten salt is kept from completely penetrating the brick, and thus contacting the unprotected insulating material or the steel furnace wall, by cooling the outside of the vessel such that the salt freezing point of 850° C. is reached roughly 8 inches through the 12 inch thickness of the brick wall. The unit can run for six months to a year at steady state operation. To maximize refractory life, the unit should be maintained at operating temperature such that thermal cycling is avoided.

From the foregoing, it is seen that the invention provides an improved refractory for the walls of molten salt process vessels, in the form of beta-alumina refractory bricks which are resistant to degradation and destructive phase transformation by fluoride-rich salt melts.

It is to be understood that what has been described is merely illustrative of the principles of the invention and that numerous arrangements in accordance with this invention may be devised by one skilled in the art without departing from the spirit and scope thereof.

What is claimed is:

1. In the molten salt process for destruction of fluorine-containing organic waste in a molten salt contained in a vessel having a refractory liner, the improvement wherein said refractory liner is comprised of beta-alumina.

2. The molten salt process as defined in claim 1, said fluorine-containing waste comprising fluorocarbons and forming fluorides in said molten salt.

3. The molten salt process as defined in claim 2, said fluorocarbons comprising a compound selected from the group consisting of chlorofluorocarbons and bromofluorocarbons.

4. The molten salt process as defined in claim 3, said compound selected from the group consisting of chlorofluoromethanes and bromofluoromethanes.

5. The molten salt process as defined in claim 1, said molten salt being a member selected from the group consisting of alkali metal carbonates, and alkali metal carbonate-alkali metal chloride mixtures.

6. The molten salt process as defined in claim 5, said molten salt reacting with said fluorine-containing waste to form alkali metal fluorides.

7. The molten salt process as defined in claim 1, said beta-alumina refractory comprised of beta-alumina bricks formed by heating a mixture of alpha alumina and sodium carbonate in the presence of sodium fluoride at temperature of about 900° C. or greater to form beta-alumina particles, mixing said beta-alumina particles with an organic binder, forming said beta-alumina binder mixture to shape as bricks by pressing said mixture in a mold, drying the resulting beta-alumina bricks and firing the dried bricks.

8. The molten salt process as defined in claim 7, said mixture of alpha-alumina and sodium carbonate comprised of a mole ratio of Na/Al of 1/11.

9. The molten salt process as defined in claim 7, said firing taking place in air at about 1600° C., said binder being removed during firing.

10. The molten salt process as defined in claim 1, said beta-alumina refractory comprised of beta-alumina bricks formed by heating a mixture of alpha alumina and sodium carbonate at temperature of about 1200° C. or greater in air to form beta-alumina particles, mixing said beta-alumina particles with an organic binder, forming said beta-alumina, binder mixture to shape as bricks by pressing said mixture in a mold, drying the resulting beta-alumina bricks and firing the dried bricks.

11. The molten salt process as defined in claim 10, said mixture of alpha-alumina and sodium carbonate comprised of a mole ratio of Na/Al of 1/11.

12. The molten salt process as defined in claim 10, said firing taking place in air at about 1600° C., said binder being removed during firing.

* * * * *